United States Patent [19]

Bloom et al.

[11] Patent Number: 4,622,437

[45] Date of Patent: Nov. 11, 1986

[54] METHOD AND APPARATUS FOR IMPROVED ELECTRONIC TOUCH MAPPING

[75] Inventors: Jonathan J. Bloom, Burlington; Michael J. Marino, Lynn; Edward L. Pepper, Jr., Medford, all of Mass.

[73] Assignee: Interaction Systems, Inc., Newtonville, Mass.

[21] Appl. No.: 676,186

[22] Filed: Nov. 29, 1984

[51] Int. Cl.⁴ .............................................. G08C 21/00
[52] U.S. Cl. ..................................................... 178/18
[58] Field of Search .......................... 178/18, 19, 20; 340/712, 706, 709

[56] References Cited

U.S. PATENT DOCUMENTS

| | | | |
|---|---|---|---|
| 2,269,599 | 1/1942 | Moodey | 178/19 |
| 3,530,241 | 9/1970 | Ellis | 178/19 |
| 3,591,718 | 7/1971 | Asano et al. | 178/19 |
| 3,624,293 | 11/1971 | Baxter | 178/18 |
| 3,696,409 | 10/1972 | Braaten | 340/365 |
| 3,699,439 | 10/1972 | Turner | 324/71 |
| 3,758,718 | 9/1973 | Fletcher et al. | 178/18 |
| 3,772,684 | 11/1973 | Scantlin | 340/365 |
| 3,875,331 | 4/1975 | Hasenbalg | 178/19 |
| 3,906,190 | 9/1975 | Light | 235/61.6 |
| 3,959,585 | 5/1976 | Mattes et al. | 178/18 |
| 3,973,256 | 8/1976 | Stoesser et al. | 340/365 |
| 4,071,691 | 1/1978 | Pepper, Jr. | 178/19 |
| 4,079,194 | 3/1978 | Kley | 178/18 |
| 4,080,514 | 3/1978 | Pobgee | 178/18 |
| 4,110,749 | 8/1978 | Janko et al. | 340/365 |
| 4,129,747 | 12/1978 | Pepper, Jr. | 178/19 |
| 4,145,748 | 3/1979 | Eichelberger et al. | 364/862 |
| 4,157,539 | 6/1979 | Hunts et al. | 340/365 |
| 4,198,539 | 4/1980 | Pepper, Jr. | 178/18 |
| 4,198,623 | 3/1980 | Misek et al. | 340/365 |
| 4,293,734 | 10/1982 | Pepper, Jr. | 178/18 |
| 4,353,552 | 10/1982 | Pepper, Jr. | 273/85 |
| 4,371,746 | 2/1983 | Pepper, Jr. | 178/18 |
| 4,374,381 | 2/1983 | Ng et al. | 340/711 |
| 4,430,917 | 2/1984 | Pepper, Jr. | 84/1.01 |
| 4,435,616 | 3/1984 | Kley | 178/18 |
| 4,476,463 | 10/1984 | Ng et al. | 178/18 X |
| 4,523,654 | 6/1985 | Quayle et al. | 178/19 |

FOREIGN PATENT DOCUMENTS 8000174 9/1980 PCT Int'l Appl. .

OTHER PUBLICATIONS

Elographics, Inc., TIX, Sep. 1, 1983.
Sierracin/Intrex Products, TransFlex, May 1, 1980.

*Primary Examiner*—Stafford D. Schreyer
*Attorney, Agent, or Firm*—Lahive & Cockfield

[57] ABSTRACT

An improved touch-panel and method of increasing the percentage of useful area of a touch-sensitive panel include electrode elements in electrical communication with an electrically conductive layer of known spatial impedance characteristics. The touch-panel structure incorporates improved electrode structure and electrode to impedance layer interfacing elements which impart a more linear mapping function within an expanded touch-sensitive region of the resistive layer. The touch-panel can be utilized in a general touch-mapping system without resort to extensive mapping coordinate correction apparatus of earlier systems.

20 Claims, 8 Drawing Figures

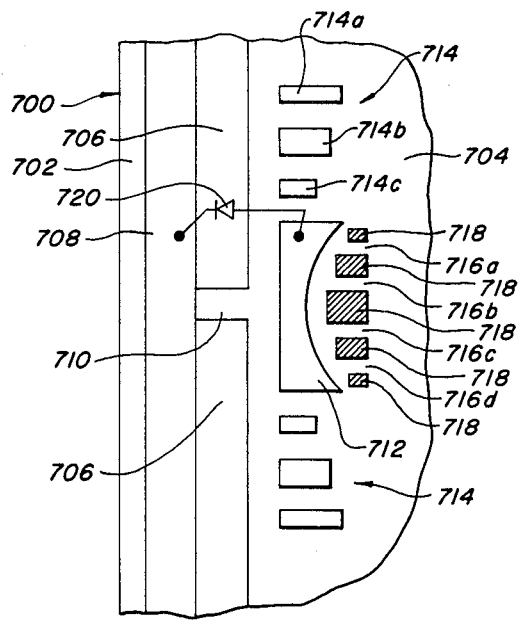
FIG. 5A
FIG. 6
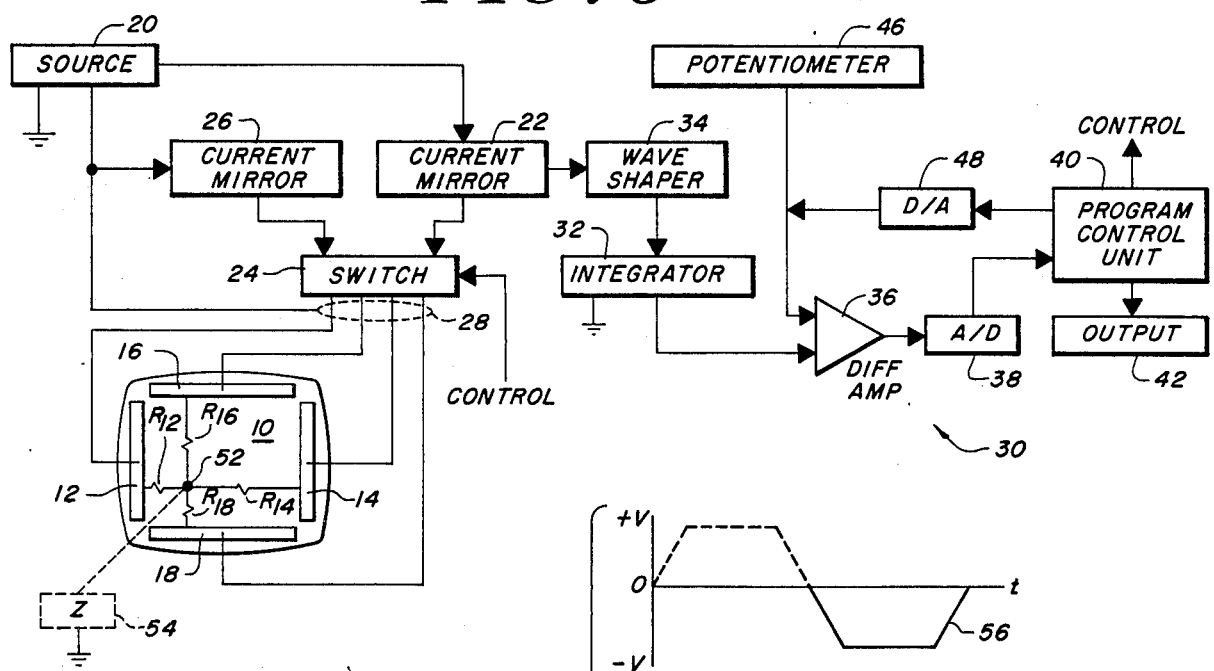
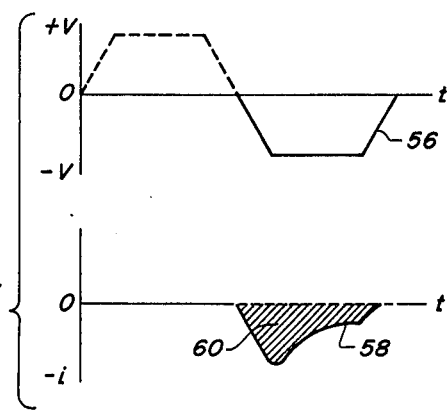
FIG. 7

4,622,437

METHOD AND APPARATUS FOR IMPROVED ELECTRONIC TOUCH MAPPING

CROSS-REFERENCE TO RELATED APPLICATION

This application is related to U.S. application Ser. No. 676,185, filed on even date herewith, for "Method and Apparatus for Electronic Touch Mapping", and assigned to the assignee hereof.

BACKGROUND

This invention relates generally to man-machine interactive methods and apparatus; and more particularly, to the mapping of an electronic disturbance on an input surface.

It is well known to provide a resistive/capacitive touch-mapping method and apparatus wherein the location at which an individual touches a display surface can be determined by an automatic electronic process. A typical application is a cathode ray tube touch terminal in which a human operator enters information to a data processing system according to the location at which the operator touches a terminal display screen. Other applications include a position indicator, switch panel and touch tablet.

One such system is described in U.S. patent application Ser. No. 452,024, assigned to the assignee hereof. That application describes a touch-responsive method and apparatus in which an operator touch is mapped by measurement of the change in current drawn by the touch through a resistive panel of known spatial resistive characteristics. In one embodiment, the apparatus employs a single electrode element along each side of a rectangular panel surface; and this electrode configuration creates a nonuniform electric field pattern in the panel in response to an applied source signal. The field nonuniformity introduces complexities and mapping errors in the mapping function because it requires the apparatus position measurement system to perform more extensive and complex position calibrating and determining procedures. In a further embodiment, the apparatus of the U.S. patent application Ser. No. 452,024 relates to a touch-responsive panel having point corner electrodes for improving the mapping accuracy in the panel corner regions.

Accordingly, objects of this invention are a touch-mapping method and apparatus with improved touch-mapping capabilities which is relatively easy to implement on a commercial basis, which operates with high accuracy and high reliability, and which is relatively low in cost and thereby suited for varied touch-mapping devices. A further object of the invention is a touch-sensitive panel having improved linear mapping properties.

Other objects of the invention will in part be obvious and will in part appear hereinafter.

SUMMARY OF THE INVENTION

The above mentioned objects are obtained by this invention which provides an improved touch-mapping system with a more linear mapping of measured impedance ratios to coordinate positions.

The invention relates generally to an improved touch-sensitive panel for use in a touch-responsive apparatus for determining the location of a current-drawing touch to the touch-sensitive panel. The panel has extending thereon an electrically conductive layer of known spatial impedance properties. The panel features a first electrode network disposed on the panel at a selected location along a first panel axis and a second electrode network disposed on the panel at a selected location along a second panel axis. At least one electrode network has plural electrode elements located along a direction transverse to the respective axis along which the electrode network is disposed. In a typical instance, there are at least three elongated electrode elements, spaced apart along the axis, in a network. Further, each electrode element is in electrical communication with the impedance layer. The first and second electrode networks define, in part, a touch-effected region of the panel.

In a preferred aspect of the invention, the touch-sensitive panel further includes a third and a fourth electrode network, each disposed at selected locations along, respectively, the first and second axes and each having at least one electrode element located along a direction transverse to the first and second axes, respectively. In most instances there are plural electrode elements spaced along the axis in each third and fourth network. The third and fourth electrode networks are spaced-apart from the first and second electrode networks, respectively, and are each in electrical communication with the impedance layer. The four electrode networks define between them the touch-effected region of the panel.

In another illustrated aspect of the invention, the touch-sensitive panel features a first electrode network disposed on the panel at a selected location along a first panel axis. This electrode network has at least one elongated electrode element positioned along a direction transverse to the first axis and in electrical communication with the impedance layer. The panel also features a second electrode network disposed on the panel at a selected location along a second panel axis. The second electrode network has at least one electrode element positioned along a direction transverse to the second panel axis and in electrical communication with the impedance layer. The first and second electrode networks define, in part, a touch-effected region of the panel. The panel further includes an interface element, which is in electrical communication with both the impedance layer and at least one of the electrode elements, for effecting substantially linear impedance mapping characteristics to a touch-effected region of the panel. The interface element can include a resistive network, which, in one aspect, is an etched portion of the impedance layer.

In another aspect, the first and second electrode networks can each include a corner electrode element disposed on the panel in proximity to a region of the intersection of axes defined by the first and second electrode networks. The corner electrodes are connected through diodes or other switch elements to adjacent electrode networks.

The particular panels described hereinbefore can be employed in connection with touch-responsive apparatus for determining the location of a current-drawing touch. The apparatus can have a signal source, which generates a signal to establish in the impedance layer a designated electrical state, and measuring circuitry, which determines the effective impedance from an electrode, of the electrode configuration in contact with the layer, to a touch. Thereby, the measuring circuitry maps the relative location of the touch. The apparatus features a switching circuitry for selectively electrically connecting, in a first mode, the signal source with the electrode elements of the first and second electrode networks and for electrically isolating, in a second mode, at least some of the electrode elements of the first and second networks from the source. The switching circuitry of the preferred embodiments of the invention include diode elements connected between the signal source and various electrode elements of the networks. The diode elements allow the electrically isolated electrode elements to be isolated not only from the source but from each other as well.

In another aspect, the invention relates to a method for mapping the useful surface area of a touch-sensitive panel for use in a touch-responsive apparatus. The apparatus determines the location of a current drawing touch to the touch-sensitive panel, the panel having extending thereon an electrical conductive layer of known spatial impedance properties. The method features the steps of providing a first electrode network disposed on the panel at a selected location along a first panel axis, providing a second electrode network disposed on the panel at a selected location along a second panel axis, providing electrical communication between the first and second electrode networks and the impedance layer, and connecting the electrode networks to the impedance layer through a simulation interface, the interface being in electrical communication with both the impedance layer and at least one of the electrode networks for effecting substantially linear impedance mapping characteristics to an expanded portion of a touch-effected region of the panel.

A touch-mapping system constructed in accord with the invention provides, in addition to the mapping of the location of a touch on an unpatterned basis, a more accurate mapping than provided by prior known devices. This accuracy is achieved through utilization of multiple electrode networks and interface elements, which effect a more linear mapping function.

A touch-mapping device according to the invention permits a user to touch an input panel to effect menu type selection and other commands for a data processing system. Alternatively, the more accurate continuous unpatterned mapping of a moving touch as provided by the invention, enables varied operations including signature verification as required for security purposes. In addition, the more accurate touch-mapping provided by an apparatus constructed in accordance with the invention can be used in computer aided design systems and other interactive display systems. A further illustrative use of apparatus according to the invention is in a switch panel.

BRIEF DESCRIPTION OF THE DRAWINGS

Other objects, features, and advantages of the invention will be apparent from the following description taken together with the illustrations, in which:

FIG. 5A illustrate a portion of a touch panel similar to FIG. 5 and embodying further features of the invention;

FIG. 6 is a block schematic diagram of a touch mapping system according to the invention; and FIG. 7 is a graph illustrating operation of the touch mapping system of FIG. 6.

DESCRIPTION OF PARTICULAR EMBODIMENTS OF THE INVENTION

Figure 1:
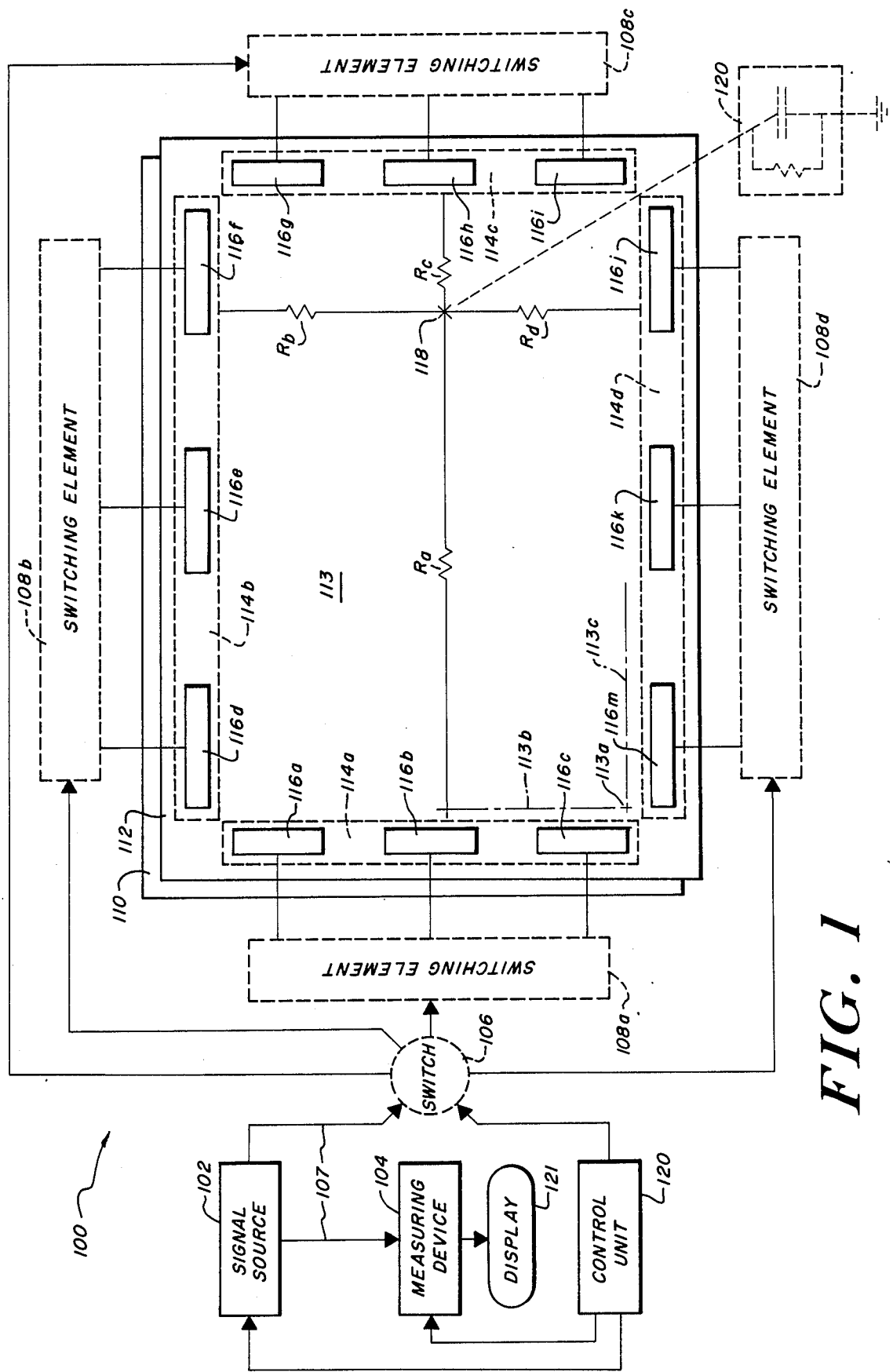
FIG. 1 broadly illustrates a first touch-mapping apparatus according to a first particular embodiment of the invention.

Referring to FIG. 1, a touch-responsive mapping apparatus 100 has a signal source 102, a measuring device 104, and a switching circuit 106. The measuring device 104 and switching circuit 106 are electrically connected to receive the signal outputs of source 102 over lines 107. The switching circuit 106 selectively connects the source outputs with each of four switching elements 108a, 108b, 108c, 108d. The illustrated touch-responsive mapping apparatus 100 also has a panel 110 with a resistive layer 112 extending thereon. The panel 110 has a usable touch-sensitive surface portion 113 bordered by a plurality of electrode networks 114a, 114b, 114c, 114d, which are arranged in a peripheral configuration around the surface portion 113.

In the illustrated embodiment, the mapping apparatus 100 provides position information defining the location, relative to a panel origin 113a and with respect to a first and second transverse panel axes 113b and 113c, of an impedance-disturbing touch. A user can, in general, select the location of the origin and select the axes. Correspondingly, the surface-defining electrode networks have the illustrated configuration, wherein pairs of electrode networks are disposed at selected, spaced-apart locations along the respective axes and, further, wherein each electrode network has at least three electrode elements spaced-apart in a direction transverse to the respective axis along which it is positioned.

Thus, in the illustrated embodiment, electrode network 114a has electrode elements 116a, 116b, 116c; electrode network 114b has electrode elements 116d, 116e, 116f; electrode network 114c has electrode elements 116g, 116h, 116i; and electrode network 114d has electrode elements 116j, 116k, and 116m. The electrode elements 116 are each disposed on resistive layer 112 and connected electrically to the respective switching elements 108a, 108b, 108c, and 108d.

During operation of the illustrated embodiment, the signal source 102 provides an electrical measuring signal of selected potential to the electrode element networks 114a, 114b, 114c, 114d through the switching circuit 106 and the respective switching elements 108a, 108b, 108c, 108d. The applied electrical measuring signal establishes an electric potential in the resistive layer 112, thereby placing the resistive layer in a designated electrical state corresponding to the applied measuring signal.

The measuring device 104 determines the location of an operator-produced touch 118 to the resistive layer 112 through evaluation of the change effected in the electrical state of the panel by the touch 118. A preferred measuring device 104 detects this change in electrical state by determining the integrated value of the current signal (that is, charge) passing through the resistive layer 112 from selected ones of the electrode networks 114a, 114b, 114c, 114d.

The architecture and method of operation of the preferred combination of the signal source 102, the measuring device 104, and the switch 106 are described in greater detail in U.S. application Ser. No. 676,185, filed on even date herewith, for Method and Apparatus for Electronic Touch Mapping, and assigned to the assignee of this application. The disclosure of that co-pending application is incorporated, in its entirety, herein by reference.

The illustrated touch-mapping apparatus 100 maps a current-drawing touch 118 to the panel 110 by measuring the integrated value of the current drawn from the electrode networks as effected by the current-drawing touch 118. This mapping operation is now described in further detail. Assume that the net effective electrical impedance of the resistive layer 112 from the electrode network 114a to the touch 118 has a value designated as $R_a$ and that the corresponding impedance of the layer from the opposite electrode network 114c to the touch 118 has the value $R_c$. Similarly, the layer impedance from the other electrode networks 114b, 114d to the touch 118 is designated, respectively, $R_b$ and $R_d$. In a typical operating sequence, a control unit 120 operates the switch 106 to apply the measuring signal from the source 102 to the electrode networks 114a, 114c. Under this condition, the measuring device 104 detects the touch-effected change in the integrated value of current drawn through the respective electrode networks which provides a measure of $R_a$ and $R_c$.

As described in greater detail in the above-mentioned co-pending application, the measuring device 104, under the control of the control unit 120, stores a signal corresponding to a measurement relating to the impedance values $R_a$ and $R_c$. Subsequently, the control unit advances to another measuring sequence in which the switch 106 is set to apply the measuring signal to the electrode networks 114b and 114d. The resultant signal received by the measuring device 104 is indicative of the change in the integrated value of current as effected by the touch 118 and determines the impedances $R_b$ and $R_d$.

Subsequently, the control unit 120 operates the measuring device 104 in order to compute the horizontal, i.e., X-axis 113c coordinate of the touch 118 from the impedance values $R_a$ and $R_c$. That is, the X-axis coordinate is a function of these two impedance values. The resultant X-axis coordinate signal from the measuring device 104 can be applied to a display terminal 121 or other output device. Similarly, the control unit 120 causes the measuring device 104 to compute the vertical, i.e., Y-axis 113b, coordinate of the position of the touch 118 on the input panel 110. This touch-mapping is a function of the impedance values $R_b$ and $R_d$. The Y-axis coordinate-identifying signal from the measuring device can also be applied to the display terminal 121 or other output device.

The illustrated touch-mapping apparatus 100 typically repeats the foregoing sequence of measurements repeatedly and at high speed in a manner that effectively monitors continuously the position of the touch 118 to the touch panel. The signal accordingly provides an output indication from the measuring device 104 which continuously corresponds to the location of the touch 118.

The illustrated touch-mapping apparatus 100 can have a panel 110 and resistive layer 112 which are optically transparent and which can be placed directly over a CRT display terminal. Further, the panel 110 and resistive layer 112 may be disposed in a position convenient for a user to trace his signature. In these and other applications, the touch panel typically is rigid, hard and self-supporting. A touch to the panel is detected and located without requiring that the touch deflect or otherwise deform any structure, thus facilitating high-speed user interaction and equipment response.

The use of a plurality of aligned, spaced-apart electrodes on each side of the layer 112 advantageously simplifies or even eliminates the calibration step referred to in the co-pending application Ser. No. 676,185, filed on even date herewith. The plurality of electrode elements on each side provide a more linear mapping of the panel resistance ratios, preferably $R_a/(R_a+R_c)$ and $R_b/(R_b+R_d)$, to coordinate position along the X-axis and the Y-axis. This improved linearity at least permits more rapid calbration, as less sampling is required, and reduced look-up table size, as fewer calibration-obtained data points are required in order to generate a coordinate position from the impedance measurements. In a preferred practice, it eliminates the need for calibration, other than defining an origin. Practice of the invention as illustrated in FIG. 1 also enables the usable touch region of the resistive layer 112 to be approximately 90% or more of the entire layer.

Figure 2:
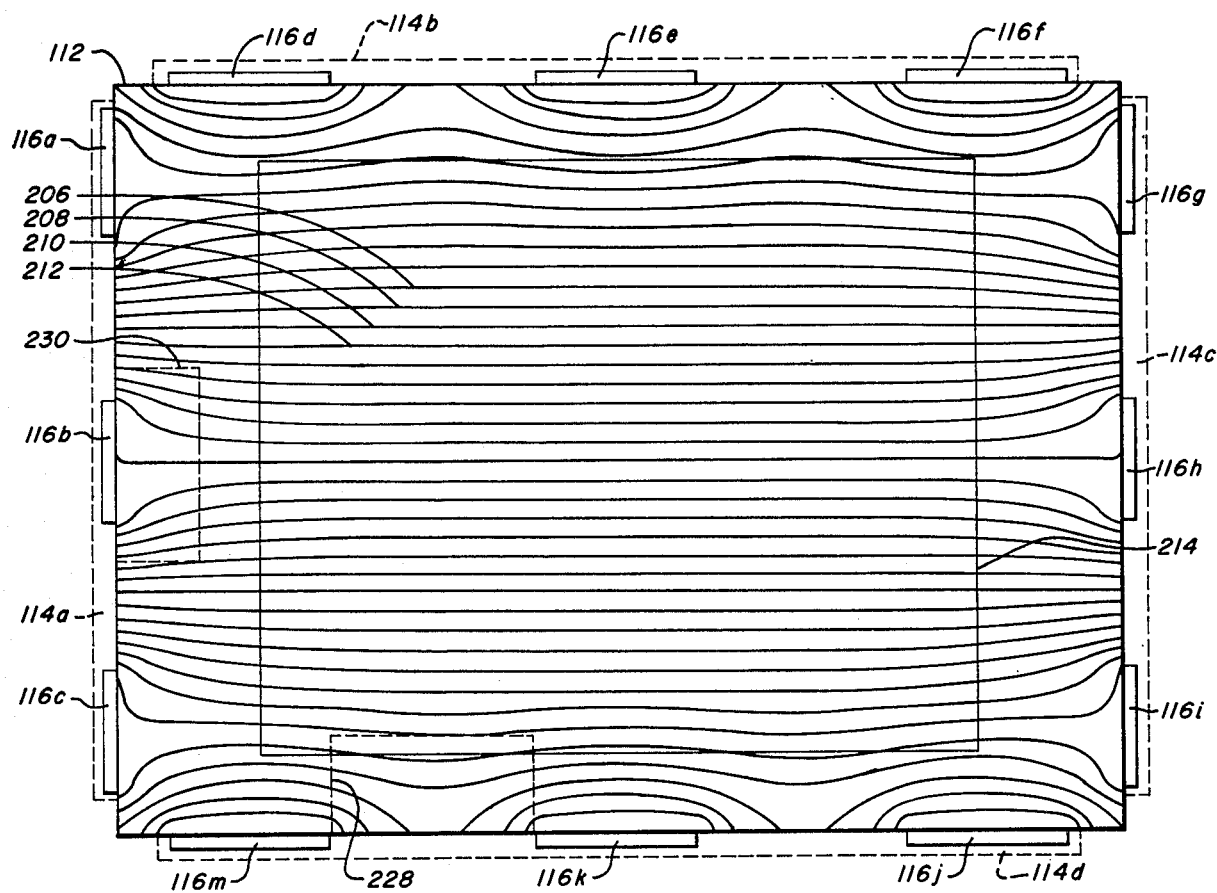
FIG. 2 illustrates an improved electric potential field pattern within the impedance layer of a touch mapping apparatus constructed in accordance with the embodiment of FIG. 1.

The greater linearity provided by the invention can be considered in more detail by referring to FIG. 2, which illustrates a plot of equipotential contours for the panel of FIG. 1 when a potential is applied across opposing active electrode networks 114b and 114d. The pattern of the equipotential contour lines 206, 208, 210, 212 shows substantially improved uniformity within a region 214 surrounded by dashed lines. Adjacent lines represent constant electric potential difference, for example, 0.25 volts, existing between corresponding adjacent regions of the resistive layer 112. The active electrode network 114d, with its three electrodes elements 116j, 116k, 116m, is in electrical communication with the resistive layer 112 at the bottom edge, while the active electrode network 114b, with its three electrodes elements 116d, 116e, 116f, is in electrical communication with the resistive layer 112 at the top edge.

The illustrated resistive layer 112 is also in electrical communication with the two inactive electrode networks 114a, 114c and their respective electrode elements 116a, 116b, 116c, and 116g, 116h, and 116i. The inactive electrode networks 114a, 114c are electrically isolated from the signal-applying source, and thus, the electrode elements 116a, 116b, 116c, 116g, 116h, 116i reside at the electric potential of regions of the resistive layer 112 adjacent thereto.

The improvements provided by the illustrated electrode configuration are represented in the large central region 214 of the layer 112, wherein the potential field is relatively uniform, as indicated by equipotential lines which are uniformly spaced and relatively straight. This uniform potential field is considered to correspond to the linear relationship between the impedance ratios and coordinate location.

The illustrated electrode network configuration of FIG. 1 also has a substantially similar equipotential profile pattern when the active electrodes are networks 114a and 114c. The pattern is then rotated 90° so that the equipotential contours run substantially vertical within the large central region 214 of the resistive layer 112.

It is important to note, however, that outside of region 214, and in particular, for example, in regions 228 and 230, equipotential lines are not uniformly spaced and are not straight. Region 228 shows a field disturbance existing between two electrode elements 116k, 116m of the bottom active electrode network 114d, while the non-uniformity of the equipotential lines within the region 230 indicates a field disturbance resulting from a short-circuit within a small region of the resistive layer 112 and caused by electrode element 116b of an inactive electrode network 114a.

The illustrated non-uniformity of the electric potential field within the regions 228, 230 is understood to result in a non-linear mapping function in these regions 228, 230. Accordingly, the discussion below reveals further practices of the invention designed to alleviate these non-uniformities and, thus, further enlarge the central region having uniform equipotential contours.

The uniformity of the equipotential contours within region 214 can be improved while simultaneously effecting an increase in the relative physical size of region 214 by increasing the number of electrodes spaced along each panel side. The increased number of electrodes, each of diminished size, reduces the regions of high non-uniformity, such as regions 228 and 230, while maintaining and improving the uniformity within the region 214. This increase in uniformity, however, comes only at a cost of increased complexity in both electrode structure and electronic hardware.

Figure 3:
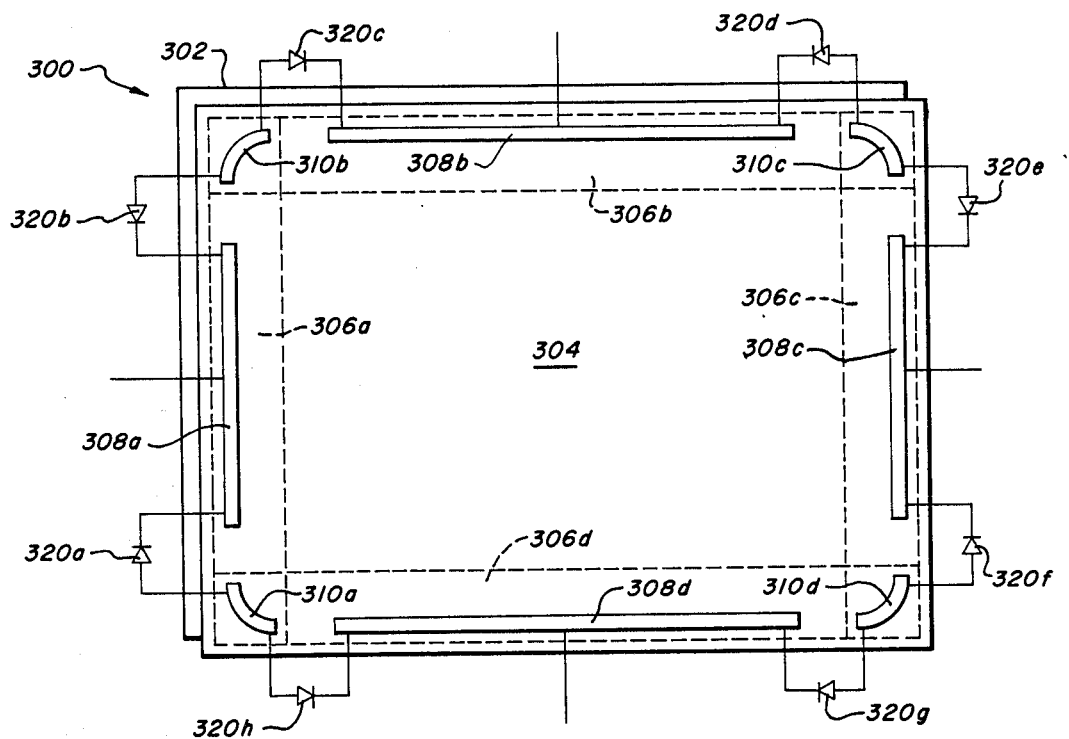
FIG. 3 illustrates a second particular embodiment of the invention employing a corner electrode configuration.

FIG. 3 shows an apparatus 300 according to another illustrated aspect of the invention which provides advantages in touch location in corners of a panel. The apparatus 300, has a panel 302 with a resistive layer 304 extending thereon, and electrode networks 306a, 306b, 306c, 306d. These apparatus components are arranged in a manner similar to that discussed above in conjunction with the similarly-named elements of FIG. 1.

The illustrated electrode networks 306a, 306b, 306c, 306d include, respectively, edge electrodes 308a, 308b, 308c, 308d. Two corner electrodes 310a, 310b are electrically connected with an edge electrode 308a through diodes 320a, 320b, respectively. In a similar fashion, the edge electrode 308b is connected through diodes 320c, 320d with corner electrodes 310b, 310c; the edge electrode 308c is connected through diodes 320e, 320f with corner electrodes 310c, 310d; and, the edge electrode 308d is connected with through diodes 320g, 320h with corner electrodes 310a, 310d. The illustrated diodes are a preferred form of switching device.

This electrode-diode configuration enables a corner electrode to participate as an active element of one of the two electrode networks to which it is connected. Specifically, where one edge electrode is driven with a negative potential—i.e., negative with respect to the potential of an adjacent edge electrode which shares the particular corner electrode—the adjoining corner electrode acts in conjunction with the negatively-driven edge electrode to form part of a single electrode network. Thus, for example, where source signals are applied such that the edge electrode 308a becomes negatively-biased with respect to the edge electrodes 308b, 308d, the corner electrodes 310a, 310b will become similarly negatively-biased with respect to the edge electrodes 308b, 308d. Consequently, the corner electrodes 310a, 310b effectively join electrode network 306a.

In operation, the illustrated touch-mapping apparatus 300 utilizes this ability to selectively include corner electrodes within an active, i.e., negatively-biased, electrode network in order to achieve relatively accurate mapping. In particular, the inclusion of the corner electrodes within a negatively-biased, active electrode network is understood to provide high mapping linearity of the measured impedance ratios $R_a/(R_a+R_c)$ and $R_b/(R_b+R_d)$ to coordinate position in the regions (including the corner regions) adjacent the active electrode network. Conversely, the exclusion of these same corner electrodes from the adjacent, "inactive" electrode networks is understood to increase mapping linearity in the region surrounding the inactive electrode network.

In one particular practice of the invention, the touch panel 300 is, as illustrated, rectangular in shape and designed to operate in conjunction with a 9 inch diagonal cathode ray tube (CRT) monitor, having a minor axis corresponding with electrode networks 306a, 306c and a major axis corresponding with electrode networks 306b, 306d. In this practice, the dimensions of the resistive layer 304 are approximately 8.5×6.5 inches. The electrode networks 306a, 306b, 306c, 306d of the preferred practice cover approximately 50% of the perimeter of the resistive layer 304. The side electrodes 308a–308d and corner electrodes 310a–310d are, preferably, evenly spaced within each respective electrode network 308a–308d. A minor-axis side electrode 308a, 308c has dimensions of approximately 3.95×0.1 inches, while a major-axis side electrode 308b, 308d has dimensions of approximately 4.26×0.1 inches. The corner electrodes 310a–310d of this practice are positioned on the resistive layer 304 to achieve a preferred desired spacing between each corner electrode end and the end of an adjacent side electrode 308a–308d. The preferred spacing between the end of a corner electrode 310a–310d and the end of a major-axis side electrode 308b, 308d is approximately 0.25 inches. The preferred spacing between the end of a corner electrode 310a–310d and the end of a minor-axis side electrode 308a, 308c is approximately 0.125 inch. One preferred corner electrode 310a–310d geometry is a curve, rounded to fit within a respective corner of resistive layer 304. Another preferred corner electrode 310a–310d geometry is a straight section, disposed diagonally between the adjacent side electrodes 308a–308d.

A preferred resistive layer 304 material which is optically transparent is indium tin oxide, with a resistivity in the order of 1000 ohms per square.

Figure 4:
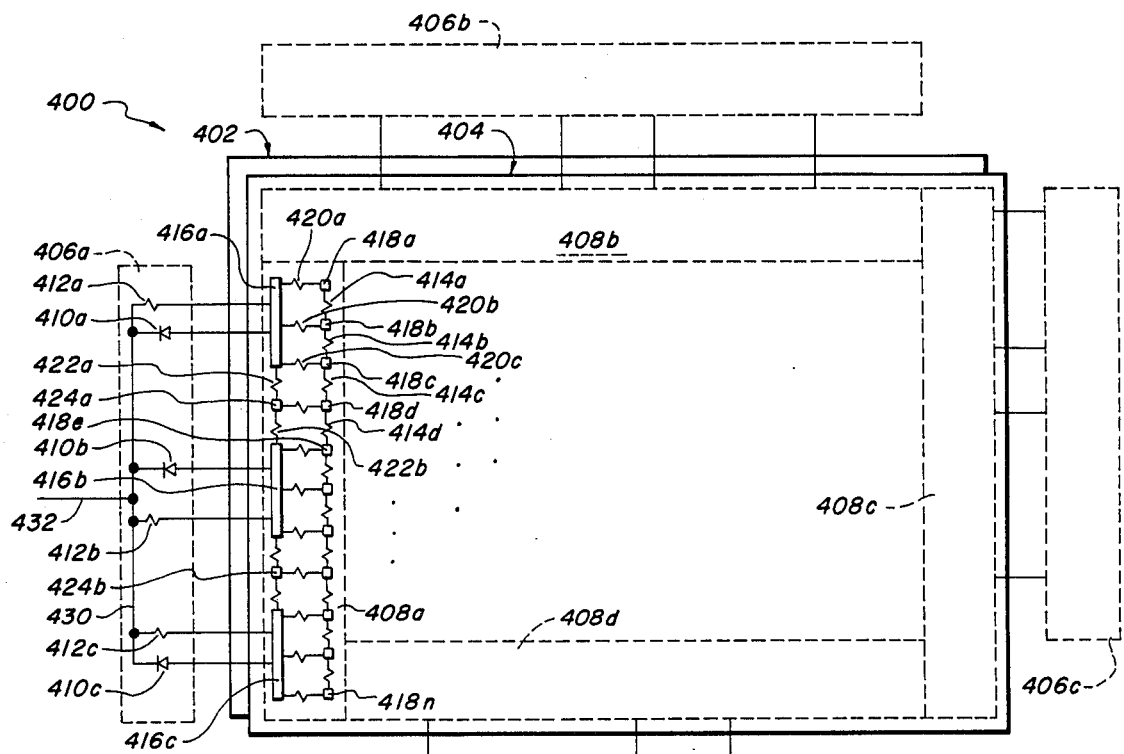
FIG. 4 illustrates a third particular embodiment of the invention utilizing a resistive network, diode switching elements, and passive electrodes for improved touch-mapping within the impedance layer.

Referring to FIG. 4, in another particular aspect of the invention, touch-mapping apparatus employs a diode switching element and an interface element. The latter element is illustrated as employing a resistive network and additional, passive, electrode elements. More particularly, the illustrated touch-panel 400 has panel element 402, having a resistive layer 404 extending thereon, electrode networks 408a, 408b, 408c, 408d, and switching elements 406a, 406b, 406c, 406d. These elements are arranged in a manner similar to that discussed above in conjunction with the similarly-named elements of FIG. 1.

The structure and operation of each electrode network 408a, 408b, 408c, 408d shown in FIG. 4 are similar. Additionally, the structure and operation of each switching element 406a, 406b, 406c, 406 are similar. Accordingly, for ease of presentation, the illustration and discussion below present a detailed description of only one electrode network 408a and its corresponding switching element 406a.

The electrode network 408a has electrode terminals 416a, 416b, 416c disposed on, and in electrical communication with, the resistive layer 404. Further, the electrode network 408a has passive electrode elements 424a, 424b, which are also disposed on, and in electrical communication with, the resistive layer 404. The terminals 416a, 416b, 416c and passive electrodes 424a, 424b are electrically connected by a resistive network to numerous distributed electrodes 418a, 418b, 418c, ..., 418n disposed on, and in electrical communication with, the resistive layer 404.

The electrical interconnections provided by the resistive network of electrode network 408a are now described with reference to the exemplary resistive network associated with terminal 416a. Terminal 416a is connected to distributed electrodes 418a, 418b, 418c through resistive elements 420a, 420b, 420c. The distributed electrodes 418a, 418b, 418c are interconnected through resistive elements 414a, 414b. Further, the medial end of terminal 416a is connected through resistive element 422a to passive electrode 424a. In turn, passive electrode 424a is connected through resistive element 422b to a distal end of terminal 416b. The distributed electrode 418c is connected through resistive element 414c to the distributed electrode 418d, while the resistive element 414d connects electrode 418d to a distributed electrode 414e adjacent the distal end of the terminal 414b.

The illustrated switching element 406a includes a terminal 430, which electrically connects a source signal lead 432 to diodes 410a, 410b, 410c and to resistors 412a, 412b and 412c. The diodes 410a, 410b, 410c in turn are electrically connected with the electrode network terminals 416a, 416b, 416c, respectively. Each resistor 412a, 412b, 412c provides an additional charge-draining electrical connection between electrode network terminals 416a, 416b, 416c, respectively and the switching element terminal 430. Any one, two or three of the resistors can be used for this purpose. However, all three resistors are preferred in that they appear to enhance the linearity and uniformity of the field pattern in the resistive layer 404.

In operation, the electrode network 408a of the touch-panel 400 is placed in the active mode by application of a negatively-biased signal from the signal source (not illustrated) over an electrode lead 432 and through switching element 406a. In particular, the diodes 410a, 410b, 410c, respectively, route this signal to the electrode network terminals 416a, 416b, 416c and, thus, establish the designated electrical state within the resistive layer 404. Concurrently, the opposing electrode network 408c is placed in the active mode through application of a like negatively-biased source signal.

During the interval in which the electrode networks 408a, 408c are placed in an active mode, the other electrode networks 408b, 408d are in an inactive mode by electrical isolation from the source element. This isolation is carried out, for example, by operation of switching circuits 406b 406d. Due to the negative potential of the resistive layer 404 and a ground potential or open circuit from the signal source to circuit 406b, 406d, the diodes of switching elements 406b and 406d are reverse-biased and the electrode terminals of electrode networks 408b, 408d are electically isolated from each other.

The terminal, electrode, and resistance network configuration of FIG. 4 advantageously acts to shape and modify the measured resistance layer impedance near the panel edges to provide an improved linear mapping of the measured impedance ratios to coordinate position at panel coordinates close to the electrode networks. This in effect increases the area of the region 214 of FIG. 2 by providing a more linear equipotential contour mapping in those areas wherein nonuniformities exist. The resistances and distributed electrodes of the embodiment of FIG. 4 thus provide an interface for improving the linear mapping function for the electronic touch mapping method and apparatus described herein.

Figure 5:
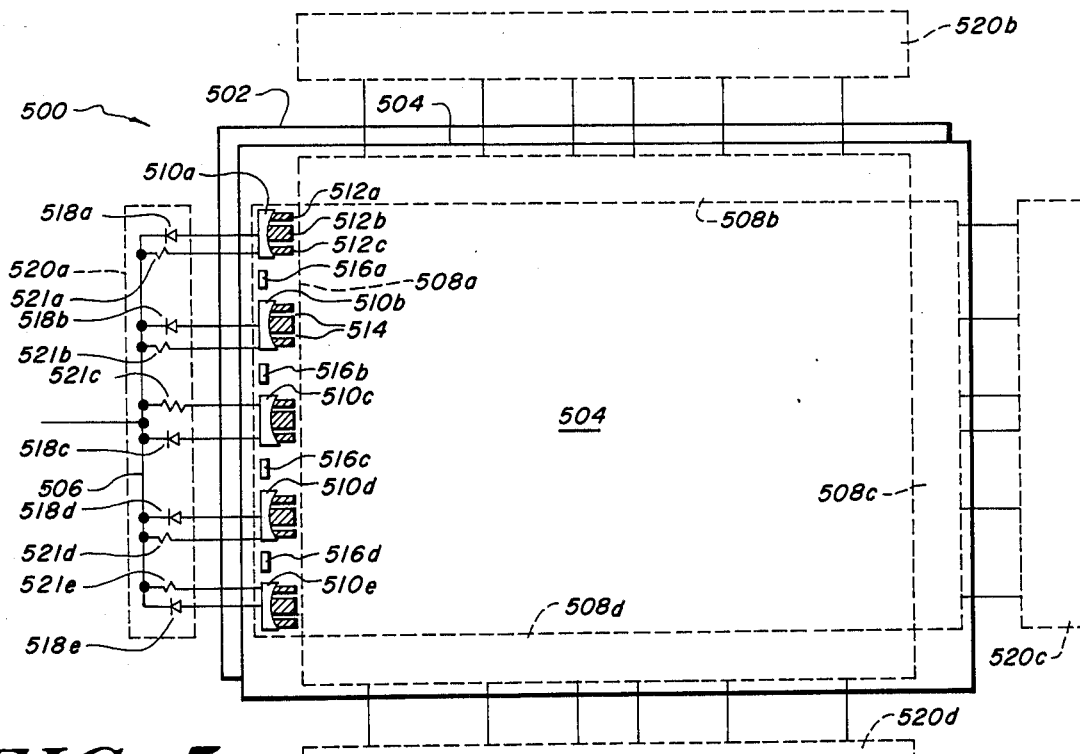
FIG. 5 illustrates a fourth particular embodiment of the invention employing shaped electrode elements, diode switching elements, etched resistive networks, and passive electrode elements.

In another preferred aspect of the invention, referring to FIG. 5, the resistance and distributed contact interface network of FIG. 4 can be implemented using an alternate interface structure for effecting enlargement of the region 214 (of FIG. 2) to provide a larger area of linear mapping between measured impedance ratios and coordinate position of a touch. A touch-panel 500 has a base panel 502 with a resistive layer 504 extending thereon. The panel further has four electrode networks 508a, 508b, 508c, 508d, and four switching elements 520a, 520b, 520c, 520d, one electrode network and one switching element associated with each edge of the panel. These elements are arranged in a manner similar to that discussed above in conjunction with the similarly named elements of FIG. 4. Further, the elements operationally cooperate in the fashion of the elements of FIG. 4. Accordingly, the discussion below is directed to the differences presented by the touch-panel 500 of FIG. 5.

An exemplary electrode network 508a of touch panel 500 has five shaped electrode elements, 510a, 510b, 510c, 510d, 510e, four passive electrodes 516a, 516b, 516c, 516d disposed between the shaped electrodes, and an etched resistive network associated with the electrode elements 510a–510e. A switching element 520a has diodes 518a, 518b, 518c, 518d, 518e which connect the shaped electrodes 510a–510e to a signal source lead 524. Resistors 521a–521e connect each electrode 510a–510e to the signal source, respectively.

The shaded regions of resistive layer 504 adjacent the shaped electrode elements 510a–510e define an etched resistive network utilized in the touch-panel 500. The resistive network has non-conductive regions—indicated by exemplary shaded regions 512a, 512b, 512c—and resistive regions—indicated by exemplary region 514—disposed between the non-conductive regions. This etched resistive network simulates the discrete component resistor network of FIG. 4. It may of course be formed by the resistive layer with a technique other than etching to provide the void or otherwise increased resistance regions.

The resistive network etched region of the resistive layer 504 can be of differing resistivities from the central touch-effected region of the resistive layer. Utilization of a differing impedance characteristic material provides a more linear mapping of the determined impedance ratios to the coordinate location as discussed in connection with FIG. 4.

In one particular practice of the invention, the touch panel 500 is, as illustrated, rectangular in shape and designed to operate in conjunction with a 9 inch diagonal cathode ray tube (CRT) monitor, having a minor axis corresponding with electrode networks 508a, 508c and a major axis corresponding with electrode networks 508b, 508d. In this practice, the dimensions of the resistive layer 508 are approximately 8.5—6.5 inches. The electrode networks 508a, 508b, 508c, 508d of the preferred practice cover approximately 50% of the perimeter of the resistive layer 504.

A preferred electrode of this practice has an inwardly-facing (i.e., directed toward the central region of resistive layer 504) curved edge with a geometry similar to that of illustrated electrode 510a–510e. A minor-axis shaped electrode, e.g., electrodes 510a–510e, has a length of approximately 0.61 inch while a major-axis shaped electrode has a length of approximately 0.82 inch. Further, a shaped electrode has a distal end width of approximately 0.25 inch and a medial region width of approximately 0.15 inch.

A preferred minor-axis passive electrode, e.g., electrodes 516a–516d, of the above practice has a rectangular shape, with a length 0.15 inch and a width of approximately 0.25 inch. A preferred major-axis passive electrode also has a rectangular shape, with a length of approximately 0.2 inch and a width of approximately 0.25 inch. The inwardly-facing edge of a passive electrode is axially aligned with a distal end of an adjacent shaped electrode.

A preferred resistive layer 504 material which is optically transparent is indium tin oxide, with a resistivity in the order of 1000 ohms per square.

The resistive network of the preferred touch panel is formed by etching the resistive panel 504 to form non-conducting regions. In one preferred etch pattern corresponding with the particular practice described above, three non-conductive regions 512a–512c are disposed immediately adjacent each shaped electrode. With regard to a resistive network adjacant a minor-axis shaped electrode, the two distal non-conductive regions 512a, 512c are smaller, having dimensions of 0.075 (length)×0.1 (width) inch, while the medial non-conductive region 512b has dimensions of 0.15×0.1 inch. With regard to a resistive network adjacant a major-axis shaped electrode, the two distal non-conductive regions 512a, 512c are smaller, having dimensions of 0.1 (length)×0.075 (width) inch, while the medial non-conductive region 512b has dimensions of 0.2×0.075 inch. The spacing between the non-conducive regions of the minor-axis etched regions is 0.075 inch, while the spacing between the non-conductive regions of the major-axis etched regions is 0.1 inch.

Thus, the embodiments of FIGS. 4 and 5 are designed to increase the effective useful area of the panel. Referring to FIG. 2, the resistive and/or shaped electrode networks effectively provide the same equipotential contour pattern found within the area designated 214 but do not require the relatively large expanse of surface illustrated around the periphery of area 214. By providing the resistive and shaped electrode networks, the border area surrounding region 214 can be significantly reduced which has the effect of increasing the percentage of useful area on the touch-responsive panel. The selected values of resistance and spacings recited herein provide two examples (FIGS. 4 and 5) of possible simulation techniques for providing an effective interfacing circuit between the active electrodes and the resistive layer covering the panel.

FIG. 5A shows a fragmentary portion of another touch panel assembly 700 construction similar to FIG. 5. The panel assembly has a glass or like insulating base panel 702 with a resistive coating 704 thereon. The panel 702 is free of the resistive coating 704 along a peripheral, border region 706. Within the border region 706, the panel is coated with a conductive terminal 708 for external connection to a source, measuring unit, or other elements of a touch mapping system. A narrow resistive region 710 extends outward from the resistive layer 704 to join and electrically connect with the terminal 708. This region forms, in effect, a series resistor, which provides drain and pattern-shaping functions, between the terminal and electrode and interface elements of the assembly 700.

As further shown, the electrode and interface elements include a shaped electrode 712 on the panel 702 within the border of the resistive layer 704 and proximate to the resistive region 710. The resistive region is hence electrically in series between the electrode 712 and the terminal 708. Aligned on the side of the electrode 712, along the edge of the resistive layer, is a passive electrode set 714. The illustrated set has three elements 714a, 714b and 714c spaced apart and aligned with the electrode 712, and of different selective sizes. The electrodes 712 and 714, which are electrically connected with the resistive layer 704, are shaped and spaced to provide the desired uniformity and linearity of the electrical pattern which they set up, when energized, in the layer 704.

A further interface element of the illustrated assembly 700 is a set of resistances 716a, 716b, 716c and 716d higher than the resistivity of the layer 704 and in circuit between the electrode 712 and the resistive layer. Voids 718 in the layer 704 form the resistances; the illustrated voids are of different sizes to form selectively differently-valued resistances. Further, the voids are arrayed adjacent the contoured edge of the electrode 712, on the side of the electrode remote from the border 706, to provide the resistances between the electrode and the touch region of the layer, which lies to the right of the electrodes 712 and 714.

The foregoing panel assembly structure is advantageously all provided by conductive and by resistive coatings on the panel 702, as well as by voids or like regions of high resistance. A switching diode 720 can be added, as a separate discrete element, and soldered between the electrode 712 and the terminal 708.

Referring to FIG. 6, a touch locating system according to the invention operates with any of the panels of FIGS. 1, 3, 4, 5, or 5A as follows. The panel has a conductive touch layer 10 of known electrical impedance and overlying the display screen of a cathode ray tube video display terminal. Four electrode networks 12, 14, 16 and 18, connect to the impedance layer 10. The networks can be any of those described hereinabove. The illustrated connections are made according to a two dimensional rectangular coordinate system, with electrode networks at the right, left, top and bottom peripheral edges of the conductive layer 10.

The source and measuring circuitry has an electrical source 20 for producing a pair of identical time varying periodic measuring voltages for application to the conductive layer 10 by way of the electrode networks. A Wilson-type current mirror circuit 22 applies one excitation voltage to one input of a double-pole double-throw switch circuitry 24, and a further balancing current mirror circuit 26 applies the other measuring voltage to the other input of the switch circuitry 24. The switching circuit 24 corresponds, for example, to switch circuits 106, 108a, 108b, 108c, 108d of FIG. 1. The four output terminals of the switch are connected to different ones of the electrode networks. The switch 24 can apply the two measuring voltages, from the current mirror circuits 22 and 26, to any pair of opposed electrode networks i.e. left/right, right/left, top/bottom and bottom/top.

The electrical current which the conductive layer 10 draws from the source voltage at any one electrode network, as determined with the switch 24, is coupled in the current mirror circuit 22 to an integrator 32, illustratively by way of a wave shaping circuit 34. The integrator and the wave shaping circuit are part of measuring unit 30. The wave shaping circuit typically includes an amplifier stage and filter stages. It can also include other wave shaping stages such as an inverter and a clamp stage. The integrator 32, which can employ a conventional series resistor and shunt compacitor, integrates the current wave form output from the wave shaper. The integrator accordingly produces an output signal responsive to the time integral of current and hence responsive to the electrical charge which the current mirror circuit 22 senses that an electrode network draws from the source. The integration can extend over a single period of the applied voltage or, as preferred to attain a larger charge signal, over many periods. The period of the source voltage and the duration of integration can be readily determined depending on the configuration of a particular system, including the configuration of the conductive layer, and on the electrical impedance of the touch being sensed.

The charge-responsive signal from the integrator 32 is measured, to determine the location of a touch to the conductive layer 10, with a differential amplifier 36, an analog to digital converter 38 that converts the amplifier output signal to digital format, and a program control unit 40. The program control unit, typically a digital microprocessor, computes a location determination in response to the charge-responsive signal and applies the resultant determination to an output device 42. The illustrated control unit also provides control signals for operating the switch 24. The output device may be a printer or other alphanumeric display device, or it may be a memory device for storing the location determination. In another illustrative instance, the output device is part of a data processing system that responds to the location determination to alter the display on the cathode ray tube terminal.

The illustrated differential amplifier 36 receives a second input signal selected to produce a null output signal when no touch is present at the conductive layer 10. The null signal is illustrated as provided with a potentiometer 46 that is manually adjustable to provide coarse nulling, together with a digital-to-analog converter 48 which the program control unit 40 drives to provide fine adjustment of the nulling signal input to the differential amplifier.

The operation of the touch locating system of FIG. 6 generally includes different sequences, including an optional calibrating sequence, a reference determining sequence and a measuring sequence. In one reference determining sequence, the conductive layer is untouched and the source excitation is applied to each pair of electrode networks, in turn. The potentiometer 46 is adjusted to null the differential amplifier output signal to zero for one electrode network. The program control unit 40 determines and stores the offset signal to apply to the D/A converter 48 for each electrode to obtain a null output signal from the amplifier 36 when that electrode is coupled with the measuring unit 30. The program control unit typically updates these stored reference voltages periodically during intervals between measuring operations, and stores each offset value for application to the D/A converter 48 during the measuring operation.

The optional calibrating operation involves applying a touch to the conductive layer 10 at known locations thereon relative to the various electrode networks, and preparing a lookup table for equating the resultant measured charge-responsive signal from the A/D converter 38 with that screen location. The program control unit 40 typically stores this lookup table, just as it stores the offset voltages.

During these operations and during touch locating operations, the conductive layer 10 typically presents to the electrode networks 12, 14, 16 and 18 a complex electrical impedance having a real, resistive/conductive component and an imaginary, capacitive component. Further, when the switch 24 is set, for example, to apply measuring voltage by way of current mirror 22 to the top electrode network 16 and to apply measuring voltage by way of current mirror 26 to the bottom electrode network 18, the two electrode networks 16 and 18 are driven with identical in-phase voltages and there ideally is no potential difference between them. The output voltage from the differential amplifier 36 is adjuncted to a null, essentially zero value in the absence of a touch to the conductive layer 10, when the only current the electrode network 16 draws is due to stray capacitances and other leakage. Note that when the switch 24 connects measuring voltages to the electrode networks 16 and 18, the other electrode networks 12 and 14 are essentially passive, in terms of not being connected to either the source 20 or to the integrator 32.

When, however, a touch is applied to the conductive layer 10, whether by a human finger or by another device presenting an electrical impedance, the touch impedance draws current from the layer 10 to ground. FIG. 6 illustrates such a touch at a location 52 on the screen and designates the touch as presenting an electrical impedance 54 to ground. The touch impedance 54 draws current from the source 20 at each electrode network 16 and 18. The current which the touch impedance draws from the electrode network 16, which at this instance is being energized through the current mirror 22, is coupled by way of that current mirror to the integrator 32 by way of the wave shaper 34.

The integrator in response produces an output signal corresponding to the electrical charge which the touch impedance 54 draws from the source voltage applied to the electrode network 16. The program control unit 40 responds to the resultant digital signal it receives from the amplifier 36 and converter 38, interrupts other operations, including reference updating, and processes the information to determine the relative location of the touch 52 from the top of the conductive layer 10, i.e., relative to the electrode network 16. The system of FIG. 6 preferably repeats this operation many times with a single setting of the switch 24 and thereby repeats and verifies each measurement made at the electrode network 16.

The system then changes the switch 24 to apply measuring voltage for example to the bottom electrode network 18 by way of the current mirror circuit 22. With that switch setting, the integrator produces an output signal responsive to the electrical charge which the conductive layer draws from the bottom electrode network 18 in response to the source voltage, and the program control unit 40 produces a resultant measure responsive to the location of the touch 52 relative to that electrode network 18. The program control unit 40 typically determines the location of the touch 52 relative to the up-down or top to bottom axis of the conductive layer 10 in response to the ratio of the electrical charge values measured from the opposed electrode networks 16 and 18. The ratio computation is one instance of an arithmetic proportional determination that determines the location of the touch in proportion to the distance between the opposed electrode networks 16 and 18, as controlled by the resistance of the layer 10.

More particularly, as further shown in FIG. 6, the illustrated resistive conductive layer 10 presents an electrical resistance R12, R14, R16 and R18 between the touch 52 and each electrode network 12, 14, 16 and 18, respectively. When the source 20 is applied, by the switch 24, to the top and bottom networks 16 and 18, the relative location of the touch between the locations of these electrode networks is proportional to the ratio of the resistances R16 and R18. Hence, a ratio of the measurements of the electrical charges which the touch impedance 54 draws through each such resistance will provide the desired location information relative to those electrode networks. In a preferred instance, the charge ratio is of form Q16/(Q16+Q18), where Q16 and Q18 are the measured charges at electrode networks 16 and 18 respectively. This ratio is linear with the distance of the touch from the bottom electrode 18, for a uniformly resistive conductive layer 10. The system of FIG. 6 can also locate a touch by a known impedance relative to a single electrode network by only one charge measurement. This single-location measurement generally is less precise than a location determined from two measurements, especially when made at opposite sides of the conductive layer.

The measuring system continues operation by applying source excitation to each of the other electrode networks 12 and 14 by way of the monitored current mirror 22, for determining the electrical charge which the touch impedance draws from the source 20 at each of these left and right electrode networks. In this manner, the control unit measures the charge drawn by the touch impedance at each electrode network and hence along both coordinates of the touch screen.

The measurement for locating the touch 52 is made in response to the electrical charge drawn from the source 20 at a given electrode network in order to account for both the resistive and the capacitive components of the touch impedance, and to account for these two components over a wide range of relative values of each. That is, a measurement of electrical charge is a measure of the time integral of the current which the touch impedance draws. The magnitude of the current at any instant is dependent in part on the real-imaginary nature of the touch impedance, because the current which the resistive portion draws typically differs by 90° in phase from the current which the capacitive impedance portion draws. The time integral of the current which the integrator 32 determines, i.e., the electrical charge which the conductive layer draws from an electrode, provides a scalar measure of the two differently-phased current components essentially independently of the phase difference.

With further reference to FIG. 6, the excitation voltage which the source 20 applies to each current mirror circuit 22 and 26 is, as stated, preferably identical and has a time-varying repetative or periodic wave form. The wave form may be an alternating wave form, in which case the wave shaper 34 includes a rectifier stage so that the integrator 32 receives a unipolar current signal. The source excitation voltage preferably is clamped relative to ground to be symmetrical about ground when it has an alternating wave form and to be clamped to ground during a portion of each period when it is a unipotential voltage.

FIG. 7 illustrates one wave form 56 with which the system of FIG. 6 operates. The solid line showing of the wave form 56 is a time varying periodic unipolar voltage clamped between ground, i.e., zero volts, and a $-V$ value and having a finite rise time between the clamped values. Alternatively, the excitation can have an alternating wave form as further indicated with the dashed line portion which rises to a value of $+V$. The current which a touch screen layer 10 typically draws in response to the unipolar voltage 56, after being rectified as occurs in a Wilson current minor circuit or as occurs in the wave shaper 34, is indicated in FIG. 7 with the wave form 58. The integrator 32 in essence produces an output signal corresponding to the area 60 within the wave form 58. The program control unit 40 responds to this measure, in the manner stated, for locating the touch relative to any one electrode network, relative to any pair of opposed electrode networks, or relative to the multicoordinate set of electrode networks.

The measuring system of FIG. 6 can include a second measuring unit—with wave shaper, integrator, potentiometer, differential amplifier and converters—connected with the current signal output from the other current mirror circuit 26. In this instance, the measuring system can measure concurrently the charge which the screen draws from two electrode networks. The second measuring unit can be connected with the program control unit 40 for this concurrent measuring operation. The switch 24 in this expanded touch locating system can be simplier, in that it needs to connect the two current mirrors 22 and 26 only to the opposed electrode network pair 12–14 and, alternatively, to the other pair 16–18, rather than requiring four sets of connections as in the system which FIG. 6 shows.

It will also be apparent that a more extensive measuring system can apply excitation to all four electrode networks directly, without a switch element 24, and can provide four measuring units which can operate concurrently or in whatever sequence the expanded control unit commands.

Additions, subtractions, deletions and other modifications of the disclosed illustrated embodiments will be apparent to those skilled in the art and within the scope of the claimed invention. In particular, other electrode configurations having interface structure for providing a more linear mapping relationship are within the following claims.

What is claimed is:

1. An improved human touch-sensitive panel for use in a touch-responsive apparatus for determining the location of a current-drawing human touch to said panel, said panel having extending thereon an electrically conductive layer of known spatial impedance properties, the panel further comprising a first electrode network means disposed on said pannel at a selected location along a first panel axis, said electrode network means having at least three elongated electrode elements disposed along a direction transverse to the first axis, each said electrode element being in electrical communication with said impedance layer and an electrical voltage source signal;

a second electrode network means disposed on said panel at a selected location along a second panel axis, said second electrode network means having at least three elongated electrode elements disposed along a direction transverse to the second axis, each said second electrode element being in electrical communication with said impedance layer and an electrical voltage source signal;

said first and second electrode network means defining, in part, a touch-effected region of said panel; and interface means in electrical communication with said resistive layer and with at least three of said electrode elements for effecting substantially linear impedance mapping characteristics to a touch-effected region of said panel.

2. The touch-sensitive panel of claim 1, further wherein said interface means includes resistive network means in electrical communication with at least one of said electrode elements and with said resistive layer for providing said electrical communication.

3. The touch-sensitive panel of claim 2 wherein said resistive network means comprises an etched portion of said resistive layer.

4. The touch-sensitive panel of claim 2 wherein said interface means includes passive electrode means in juxtaposition to said electrode network means and in electrical communication with said resistive layer.

5. The touch-sensitive panel of claim 1 wherein at least one of said first and second electrode network means includes a plurality of shaped electrode elements disposed on, and in electrical communication with, said resistive layer, each said shaped electrode element having at least a non-linear side facing an interior portion of said impedance layer.

6. The touch-sensitive panel of claim 1 wherein said first and second electrode network means each include a corner electrode element disposed on the panel in proximity to a region of intersection of axes of said first and second electrode networks, and wherein each said first and second electrode network means further includes an electrode element electrically connected with the respective corner electrode element of said first and second electrode network means through a diode.

7. The touch-sensitive panel of claim 6 wherein each said corner electrode element has a substantial portion thereof directed at an angle to both of said first and second axes 8. In a touch-responsive apparatus for determining the location of a current-drawing touch to a panel, said panel having extending thereon an electrically conductive layer of known spatial impedance properties and an electrode configuration in electrical contact with said layer, said apparatus having a source means for generating an electrical signal to establish in said impedance layer a designated electrical state, said apparatus further having means for determining the effective impedance from an electrode, of said electrode configuration, in contact with said layer to a said touch, for mapping the relative location of the touch, the improvement comprising a first electrode network means disposed on said panel at a selected location along a first panel axis, said electrode network means having at least three elongated electrode elements disposed along a direction transverse to the first axis, each said electrode element being in electrical communication with said impedance layer;

a second electrode network means disposed on said panel at a selected location along a second panel axis, said second electrode network means having at least three elongated electrode elements disposed along a direction transverse to the second axis, each said second electrode element being in electrical communication with said impedance layer;

said first and second electrode network means defining, in part, a touch-effected region of said panel;

a switching means having at least a first and a second mode and connected for selectively electrically connecting, in the first mode, the source means with at least one of the electrode elements of the first and second electrode network means, and for electrically isolating, in the second mode, at least some of the electrode elements of the first and second electrode network means from said source means; and interface means in electrical communication with said impedance layer and with at least three of said electrode elements for effecting substantially linear impedance mapping characteristics to a touch-effected region of said panel.

9. In the apparatus of claim 8, the improvement further comprising a third electrode network means disposed at a selected location along said first axis, said third electrode network means having at least three elongated electrode elements spaced apart along a direction transverse to said first axis, and spaced apart from said first electrode means, each said third electrode element being in electrical communication with said impedance layer;

a fourth electrode network means disposed at a selected location along said second axis spaced apart from said second electrode network means, said fourth electrode means having at least three elongated electrode elements spaced apart along a direction transverse to said second axis, each said fourth electrode element being in electrical communication with said impedance layer; said four electrode network means defining between them said touch-effected region of said panel, and wherein said switching means comprises a diode means in a series electrical connection between said source means and at least three said electrode elements, the diode means having one diode element for each connected electrode element, and said diode elements have a circuit configuration for applying the same potential to selectively one of the first and third, or second and fourth, electrode network means.

10. In the apparatus of claim 9, the improvement wherein said switching means further comprises resistive means in a series electrical connection between at least one said electrode element and said source means for limiting electric charge build-up on said impedance layer.

11. In a human touch-responsive apparatus for determining the location of a current-drawing human touch to a touch-sensitive panel means, said panel means having extended thereon an electrically conductive layer of known spatial impedance properties and further having an electrode configuration in electrical contact with the layer, said apparatus having a source means for generating a signal to establish in said impedance layer a designated electrical state, said apparatus further having measuring means for determining the effective impedance from an electrode, of said electrode configuration, in contact with said layer, to said touch, for mapping the relative location of the touch, the improvement comprising a first electrode network means disposed on said panel means at a selected location along a first panel axis, said electrode network means having at least three elongated electrode elements spaced-apart along a direction transverse to the first axis, each said electrode element being in electrical communication with said impedance layer;

a second electrode network means disposed on said panel means at a selected location along a second panel axis, said electrode network means having at least three elongated electrode elements spaced-apart along a direction transverse to the second axis, each said second electrode element being in electrical communication with said impedance layer;

said first and second electrode network means defining, in part, a touch-effected region of said panel means; and a switching means for selectively electrically connecting, in a first mode, the source means with at least some of the electrode elements of the first and second electrode network means and for electrically isolating in a second mode, at least some of the electrode elements of the first and second electrode network means from said source means.

12. The apparatus of claim 11, wherein said improvement comprises a third electrode network means disposed at a selected location along said first axis, said third electrode network means having at least three elongated electrode elements spaced apart along a direction transverse to said first axis, and spaced apart from said first electrode means, each said third electrode element being in electrical communication with said impedance layer;

a fourth electrode network means disposed at a selected location along said second axis spaced apart from said second electrode network means, said fourth electrode means having at least three elongated electrode elements spaced apart along a direction transverse to said second axis, each said fourth electrode element being in electrical communication with said impedance layer;

said four electrode network means defining between them said touch-effected region of said panel, and wherein said switching means comprises a diode means in an electrical series connection between and in communication with said source means and at least three said electrode elements, the diode means having one diode element for each connected electrode element, and said diode elements have a circuit configuration for applying the same potential to selectively one of the first and third, or second and fourth, electrode network means.

13. The apparatus of claim 12, wherein said switching means further comprises resistive means in series electrical connection between at least one said electrode element and said source means for limiting electric charge build-up on said impedance layer.

14. An improved human touch-sensitive panel for use in a touch-responsive apparatus for determining the location of a current-drawing human touch to said panel, said panel having extending thereon an electrically conductive layer of known spatial impedance properties, said panel comprising a first electrode network means disposed on said panel at a selected location along a first panel axis, said electrode network means having at least one elongated electrode element along a direction transverse to the first axis, said electrode element being in electrical communication with said impedance layer and an electrical voltage source signal;

a second electrode network means disposed on said panel at a selected location along a second panel axis, said second electrode network means having at least one elongated electrode element along a direction transverse to the second axis, said second electrode element being in electrical communication with said impedance layer and an electrical voltage source signal;

said first and second electrode network means defining, in part, a touch-effected region of said panel;

interface means in electrical communication with said resistive layer and with at least one of said electrode elements for effecting substantially linear impedance mapping characteristics to a touch-effected region of said panel;

said interface means including resistive network means in electrical communication with at least one of said electrode elements and with said resistive layer for providing said electrical communication; and said resistive network means including an etched portion of said resistive layer.

15. The touch-sensitive panel of claim 14 wherein said interface means includes passive electrode means in juxtaposition to said electrode network means and in electrical communication with said resistive layer.

16. An improved human touch-sensitive panel for use in a touch-responsive apparatus for determining the location of a current-drawing human touch to said panel, said panel having extending thereon an electrically conductive layer of known spatial impedance properties, said panel comprising a first electrode network means disposed on said panel at a selected location along a first panel axis, said electrode network means having at least one elongated electrode element along a direction transverse to the first axis, said electrode element being in electrical communication with said impedance layer and with a source of electrical potential;

a second electrode network means disposed on said panel at a selected location along a second panel axis, said second electrode network means having at least one elongated electrode element along a direction transverse to the second axis, said second electrode element being in electrical communication with said impedance layer and with a source of electrical potential;

said first and second electrode network means defining, in part, a touch-effected region of said panel; and interface means in electrical communication with said resistive layer and with at least one of said electrode elements for effecting substantially linear impedance mapping characteristics to a touch-effected region of said panel;

wherein at least one of said first and second electrode network means includes a shaped electrode element disposed on, and in electrical communication with, said resistive layer, said shaped electrode element having at least a non-linear side facing an interior portion of said impedance layer.

17. An improved touch-sensitive panel for use in a touch-responsive apparatus for determining the location of a current-drawing touch to said panel, said panel having extending thereon an electrically conductive layer of known spatial impedance properties, said panel comprising a first electrode network means disposed on said panel at a selected location along a first panel axis, said electrode network means having at least one elongated electrode element along a direction transverse to the first axis, said electrode element being in electrical communication with said impedance layer;

a second electrode network means disposed on said panel at a selected location along a second panel axis, said second electrode network means having at least one elongated electrode element along a direction transverse to the second axis, said second electrode element being in electrical communication with said impedance layer; said first and second electrode network means defining, in part, a touch-effected region of said panel; interface means in electrical communication with said resistive layer and with at least one of said electrode elements for effecting substantially linear impedance mapping characteristics to a touch-effected region of said panel;

said first and second electrode network means each including a corner electrode element disposed on the panel in proximity to a region of intersection of axes of said first and second electrode networks, and a diode means for electrically connecting an electrode element of each said first and second electrode network means with the respective corner electrode element of said first and second electrode network means.

18. In a human touch-responsive apparatus for determining the location of a current-drawing human touch to a panel, said panel having extending thereon an electrically conductive layer of known spatial impedance properties and an electrode configuration in electrical contact with said layer, said apparatus having a source means for generating a signal to establish in said impedance layer a designated electrical state, said apparatus further having means for determining the effective impedance from an electrode, of said electrode configuration, in contact with said layer to a said touch, for mapping the relative location of the touch, the improvement comprising a first electrode network means disposed on said panel at a selected location along a first panel axis, said electrode network means having at least one elongated electrode element along a direction transverse to the first axis, said electrode element being in electrical communication with said impedance layer and an electrical voltage source;

a second electrode network means disposed on said panel at a selected location along a second panel axis, said second electrode network means having at least one elongated electrode element along a direction transverse to the second axis, said second electrode element being in electrical communication with said impedance layer and an electrical voltage source;

said first and second electrode network means defining, in part, a touch-effected region of said panel;

a switching means for selectively electrically connecting, in a first mode, the source means with at least one of the electrode elements of the first and second electrode network means and for electrically isolating in a second mode, at least some of the electrode elements of the first and second electrode network means from said source means;

interface means in electrical communication with said impedance layer and with at least one of said electrode elements for effecting substantially linear impedance mapping characteristics to a touch-effected region of said panel; and said switching means comprises a diode means in a series electrical connection between said source means and at least one said electrode element, said diode means having a circuit configuration for applying the same potential to selectively one of the first and third, or second and fourth, electrode network means.

19. In a human touch-responsive apparatus for determining the location of a current-drawing human touch to a panel, said panel having extending thereon an electrically conductive layer of known spatial impedance properties and an electrode configuration in electrical contact with said layer, said apparatus having a source means for generating a signal to establish in said impedance layer a designated electrical state, said apparatus further having means for determining the effective impedance from an electrode, of said electrode configuration, in contact with said layer to a said touch, for mapping the relative location of the touch, the improvement comprising a first electrode network means disposed on said panel at a selected location along a first panel axis, said electrode network means having at least three elongated electrode elements along a direction transverse to the first axis, each said electrode element being in electrical communication with said impedance layer and an electrical voltage source;

a second electrode network means disposed on said panel at a selected location along a second panel axis, said second electrode network means having at least three elongated electrode elemenets along a direction transverse to the second axis, each said second electrode element being in electrical communication with said impedance layer and an electrical voltage source;

a third electrode network means disposed at a selected location along said first axis, said third electrode network means having at least three elongated electrode elements space apart along a direction transverse to said first axis, and spaced apart from said first electrode means, each said third electrode element being in electrical communication with said impedance layer;

a fourth electrode network means disposed at a selected location along said second axis spaced apart from said second electrode network means, said fourth electrode means having at least three elongated electrode elements spaced apart along a direction transverse to said second axis, each said fourth electrode element being in electrical communication with said impedance layer; said four electrode network means defining between them said touch-effected region of said panel;

a switching means for selectively electrically connecting, in a first mode, the source means with at least one of the electrode elements of the first and third or second and fourth electrode network means and for electrically isolating in a second mode, at least some of the electrode elements of the electrode network means from said source means; and said switching means comprises a parallel combination of a diode means and a resistive means in a series electrical connection between said source means and at least one said electrode element, said diode means having a circuit configuration for applying the same potential to selectively one of the first and third, or second and fourth, electrode network means.

20. The apparatus of claim 19 further wherein each said electrode is connected to said source in electrical series connection through a said respective parallel combination of resistor and diode.

* * * * *